(12) United States Patent
Krammer et al.

(10) Patent No.: US 11,647,774 B2
(45) Date of Patent: May 16, 2023

(54) SUBSTANCE MIXTURES

(71) Applicant: Symrise AG, Holzminden (DE)

(72) Inventors: Gerhard Krammer, Holzminden (DE); Sven Siegel, Höxter (DE); Günter Kindel, Höxter (DE)

(73) Assignee: SYMRISE AG, Holzminden (DE)

( * ) Notice: Subject to any disclaimer, the term of this patent is extended or adjusted under 35 U.S.C. 154(b) by 1377 days.

(21) Appl. No.: 14/398,320

(22) PCT Filed: Apr. 25, 2013

(86) PCT No.: PCT/EP2013/058592
§ 371 (c)(1),
(2) Date: Oct. 31, 2014

(87) PCT Pub. No.: WO2013/164241
PCT Pub. Date: Nov. 7, 2013

(65) Prior Publication Data
US 2015/0086693 A1    Mar. 26, 2015

(30) Foreign Application Priority Data
May 4, 2012 (EP) .................... 12166745

(51) Int. Cl.
| A23L 27/00 | (2016.01) |
| A23L 2/56 | (2006.01) |
| A23G 4/06 | (2006.01) |
| A23L 27/29 | (2016.01) |
| A23L 27/20 | (2016.01) |
| A23L 27/30 | (2016.01) |
| A23L 33/105 | (2016.01) |

(52) U.S. Cl.
CPC .............. *A23L 27/88* (2016.08); *A23G 4/068* (2013.01); *A23L 2/56* (2013.01); *A23L 27/203* (2016.08); *A23L 27/29* (2016.08); *A23L 27/36* (2016.08); *A23L 27/86* (2016.08); *A23L 33/105* (2016.08); *A23V 2002/00* (2013.01); *A23V 2200/00* (2013.01)

(58) Field of Classification Search
CPC ........................................................ A23L 2/60
See application file for complete search history.

(56) References Cited

U.S. PATENT DOCUMENTS

| 2007/0166819 A1 | 5/2007 | Prakash et al. |
| 2010/0151055 A1* | 6/2010 | Riess ................... A23L 1/2366 424/679 |
| 2010/0196554 A1 | 8/2010 | Rivera et al. |
| 2011/0195170 A1* | 8/2011 | Shigemura ........... A23C 9/1307 426/548 |

FOREIGN PATENT DOCUMENTS

| EP | 1 210 880 A1 | 6/2002 |
| EP | 2 186 506 A1 | 5/2010 |
| EP | 2 298 084 A1 | 3/2011 |
| WO | 2005/048743 A1 | 5/2005 |

OTHER PUBLICATIONS

Klesk et al "Aroma Extract Dilution Analysis of Cv. Marion (*Rubus* spp. hyb) and Cv. Evergreen (*R. laciniatus* L.) Blackberries," J. Agric. Food Chem 2003, vol. 51, Issue No. 11, Apr. 25, 2003, pp. 3436-3441.
First Examination Report dated Jul. 8, 2014 in corresponding European Application No. 12 166 745.5.
Second Examination Report dated Dec. 20, 2017 in corresponding European Application No. 12 166 745.5.
European Search Report dated Oct. 12, 2012 in corresponding European Application No. 12 166 745.5.

* cited by examiner

*Primary Examiner* — Amber R Orlando
*Assistant Examiner* — Philip A Dubois
(74) *Attorney, Agent, or Firm* — Polsinelli PC

(57) ABSTRACT

There are proposed substance mixtures comprising
(a) 20 to 80% by weight of monocyclic terpenes and
(b) 80 to 20% by weight of active substances selected from the group consisting of rebaudiosides or plant extracts comprising them, steviosides or plant extracts comprising them, naringin dihydrochalcone, mogrosides or plant extracts comprising them, rubusosides or plant extracts comprising them.

19 Claims, No Drawings

SUBSTANCE MIXTURES

FIELD OF THE INVENTION

The invention is located in the field of the aroma substances and relates to novel substance mixtures comprising monocyclic terpenes and specific active substances, to foodstuffs comprising them, to a method of enhancing taste, and to the use of the active substances as taste enhancers.

PRIOR ART

From the botanical point of view, citrus plants are a plant genus from the rue family (Rutaceae), which have their natural habitat in the tropical and subtropical regions of South-East Asia. For the chemist, in particular the food chemist, citrus fruits are unique sources of a large number of monocyclic terpenes, which share the fact that they have the unique citrus odor and flavor, which is normally considered to be a synonym for freshness and cleanness. The fact that approximately 20% of all Internet entries on this subject are related to cookery proves that citrus aromas are also important for gourmets.

On the whole, citrus aromas in general and monocyclic terpenes in particular are important commercial products for the aroma substance industry. A considerable disadvantage is that the substances are generally highly sensitive to oxidization. For example, d-limonene is known to be degraded in the air to give carvone, carveol and terpineol. In this process, the fruity, citrus and orange notes are masked by the intensely spicy and herbaceous taste notes of the degradation products. It is particularly the caraway note of d-carvone which very rapidly comes to the fore, which is extraordinarily undesirable from the point of view of the food technician who wishes to create a product with citrus flavor.

The problem of the terpenes' lack of oxidation resistance is known from the literature, and there has therefore been no lack of attempts to prevent, or at least slow down, the substances' oxidative degradation. Approaches in which known antioxidants, such as, for example, BHT, BHA or tocopherol, have been added, have proved to be unsatisfactory, in particular because the presence of these additions is not desirable in foodstuffs [cf. Kimura et al., J. Agricult. Food Chem. 31, S.800-804 (1983), ibid. 47, 1661-1663 (1983)]. The international patent application WO 1998 058656 A1 (Hauser) proposes to stabilize the citrus components by adding rosmarinic acid, but this alternative, too, proves to be insufficient under practice conditions.

Instead of stabilizing the citrus components by additives, the alternative of excluding the oxygen by encapsulating the terpenes is found in the literature. Thus, for example, U.S. Pat. No. 5,603,952 (Soper) proposes to enclose terpenes in capsules made of fish gelatin. However, this greatly limits the field of application of the products, because capsules are not desired in all applications.

The subject-matter of US 2007 0116819 A1 is sweetener compositions which essentially comprise the natural "high-potential sweeteners" together with omega-unsaturated fatty acids and optionally additives, which affect the taste of the mixtures. Example A1 discloses a diet drink which comprises rebaudioside A as sweetener. Erythritol is added to enhance the sweetening action. The mixture also comprises limonene, which, however, only acts as a dispersant.

WO 2005 048743 A1 discloses foodstuffs with a fruit component and which combine various freshness components (for example menthol) with coolants. Sweeteners, such as, for example, *stevia*, may also be present. The examiner cites this document as novelty-injurious for claims 1, 4 and 13. Table 6 discloses a preparation comprising menthol and *stevia*, the quantitative ratio being 0.25:99.75.

Subject-matter of EP 2298084 A1 is sweetener-reduced products which combine natural sweeteners with phyllodulcin. Paragraph 144 discloses a preparation which combines rebaudioside with various coolants which have a cyclic monoterpene structure. The weight ratio of rebaudioside to monoterpene in formulation A is 13:87 and in formulation B is 5:9.

It was therefore the object of the present invention to identify an alternative and more efficient way for counteracting the flavor impairment of citrus aromas as the result of oxidative degradation.

DESCRIPTION OF THE INVENTION

Subject-matter of the invention is substance mixtures comprising
(a) 20 to 80% by weight of monocyclic terpenes and
(b) 80 to 20% by weight of active substances selected from the group consisting of rebaudiosides or plant extracts comprising them, steviosides or plant extracts comprising them, naringin dihydrochalcone, mogrosides or plant extracts comprising them, rubusosides or plant extracts comprising them.

Surprisingly, it has been found that, while the addition of the active substances in the stated ratios, in particular of rebaudiosides or stevia extracts with a high rebaudioside content, cannot prevent the oxidative degradation of the monocyclic terpenes, so that the latter may still be present in the preparations in certain amounts, the undesirable herbaceous taste notes are masked. Indeed, the addition of rebaudioside, in particular to d-limonene, results in the citrus flavor being enhanced. This effect can be increased further by the addition of further sweeteners, in particular glycyrrhizic acid derivatives. Accordingly, the solution of the problem differs already fundamentally from the abovementioned prior art, because the oxidative degradation of the terpenes is accepted, and the unpleasant flavor is masked instead.

Monocyclic Terpenes

Most monocyclic monoterpenes (component a) are derived from p-menthane and have a cyclohexane skeleton. Besides menthane, the most important representatives include phellandrene, terpinols, terpines, cymene and limonene.

For the purposes of the invention, limonene is the preferred monocyclic terpene since it is highly important in terms of application and is particularly susceptible to oxidative degradation. The substance occurs as two enantiomers, namely (R)-(+)-limonene (also referred to as D-(+) or (+)-limonene for short) and (S)-(−)-limonene (also referred to as L-(−)-limonene or (−)-limonene). The racemate of the two enantiomers is also referred to as dipentene.

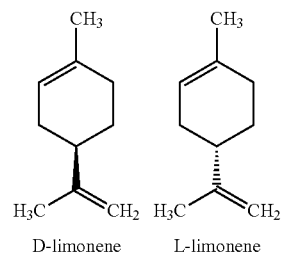

D-limonene     L-limonene

For the purposes of the present invention, D-limonene is the preferred monocylic terpene.

Rebaudiosides

As has been said, the technical teaching of the invention in its main development is to add, to the monocylic terpenes in general and to D-limonene in particular, rebaudiosides (component b), which not only masks the herbaceous taste of the degradation products, but indeed enhances the citrus note.

Rebaudiosides belong to the steviosides, the main components of the plant *Stevia rebaudiana*, also referred to as sweetleaf or sugarleaf.

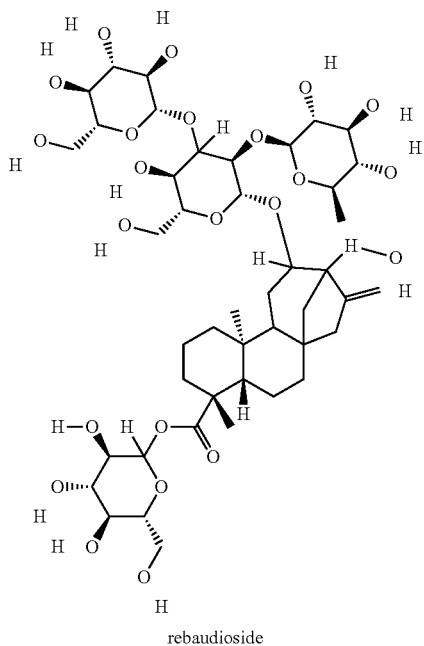

rebaudioside

10% of the leaves' dry matter are accounted for by the diterpene glycoid stevioside, followed by rebaudioside A (2 to 4% by weight) and ten further steviol glycosides, such as, for example, dulcoside. Rebaudiosides and *stevia* extract are nowadays approved in most countries as sweeteners; a daily intake of up to 4 mg stevioside per kilogram bodyweight is considered to be acceptable. For the purposes of the invention, it is possible to employ individual rebaudiosides or the extracts of the *stevia* plant. Particularly preferred, however, is the use of rebaudioside A, since this substance features lower bitterness and the highest sweetening power. The substance mixtures according to the invention may comprise components (a) and (b) in a weight ratio of from approximately 1:99 to approximately 99:1, preferably approximately 25:75 to approximately 75:25 and particularly approximately 40:60 to approximately 60:40.

Active Substances

Various other active substances which likewise enhance the citrus note without featuring any fruit aroma themselves, may also be employed as an alternative or in addition to the rebaudiosides and/or *stevia* extracts as component (a); they are:

naringin,
dihydrochalcones,
mogrosides and
extracts of plants of the genus *Rubus*.

Naringin is a polyphenolic glycoside which is found in grapefruit and pomelo and which imparts a bitter taste to these fruits.

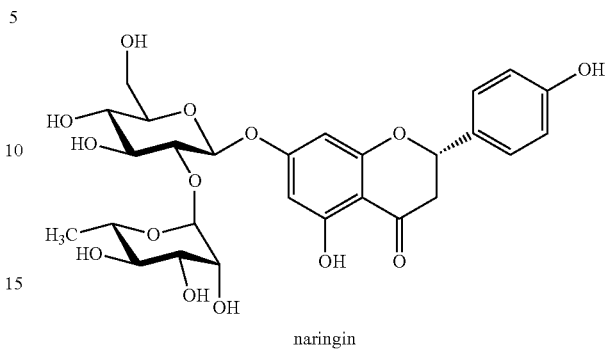

naringin

The substance is known in particular due to its hypolipidemic activity.

The dihydrochalcones, too, are polyphenols; the two representatives naringin dihydrochalcone and neohesperidin dihydrochalcone, which are known as artificial sweeteners, must be emphasized in particular:

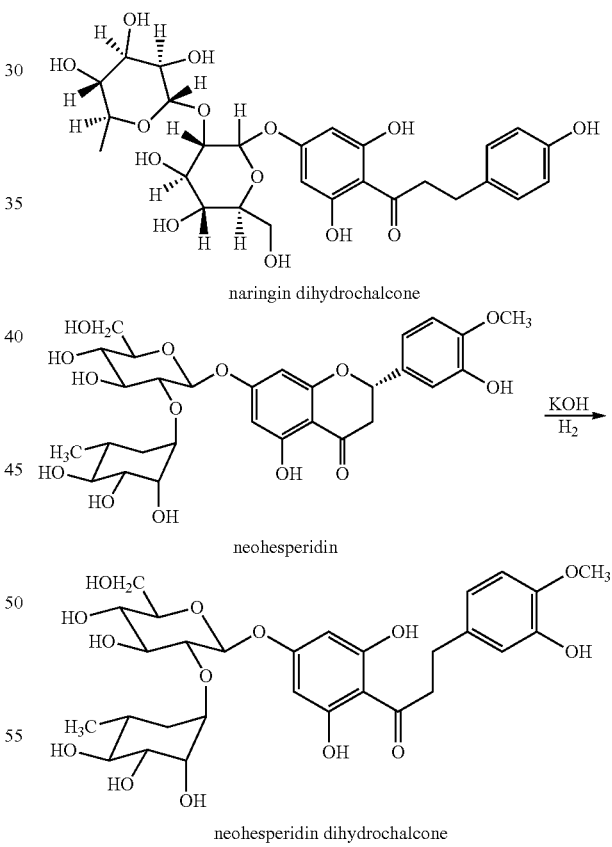

The term mogrosides refers to a group of cucurbitan glycosides which are known as a component of the natural sweetener luo han guo. Mogroside-5, which is 400 times sweeter than sugar, must be emphasized here.

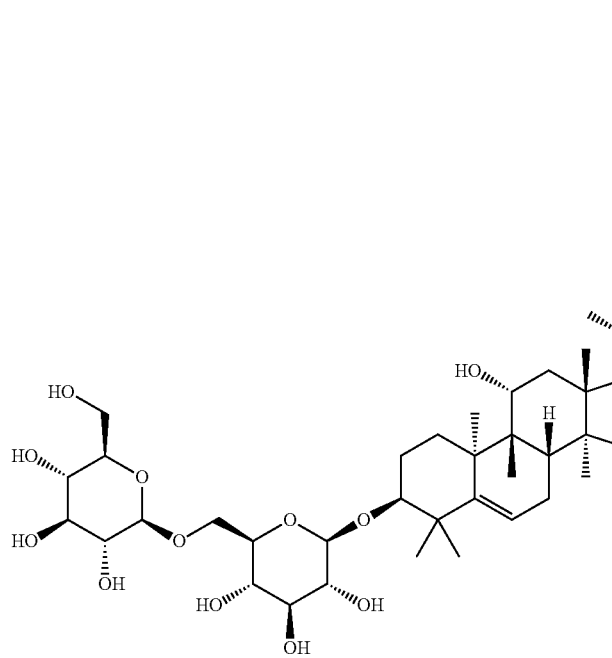

mogroside-5

Finally, suitable as component (b) are extracts of plants selected from the group consisting of *Rubus allegheniensis, Rubus arcticu, Rubus strigosus, Rubus armeniacus, Rubus caesius, Rubus chamaemorus, Rubus corylifolius* agg., *Rubus fruticosus* agg., *Rubus geoides, Rubus glaucus, Rubus gunnianus, Rubus idaeus, Rubus illecebrosus, Rubus laciniatus, Rubus leucodermis, Rubus loganobaccus, Rubus loxensis, Rubus nepalensis, Rubus nessensis, Rubus nivalis, Rubus odoratus, Rubus pentalobus, Rubus phoenicolasius, Rubus saxatilis, Rubus setchuenensis, Rubus spectabilis* and *Rubus ulmifolius* and their mixtures. These are essentially extracts of different blackberry and raspberry species with a ruboside content. Extracts of *Rubus Suavissimus* are preferred.

Glycyrrhizic Acid and Derivatives

Surprisingly, it has been found that the addition of the abovementioned active substances not only masks the undesired taste of the terpene degradation products, but, on the contrary, also further enhances the citrus note. The latter effect can be increased even more for the purposes of the invention when glycyrrhizic acid or a corresponding salt (optional component c) is added as additional flavor enhancer.

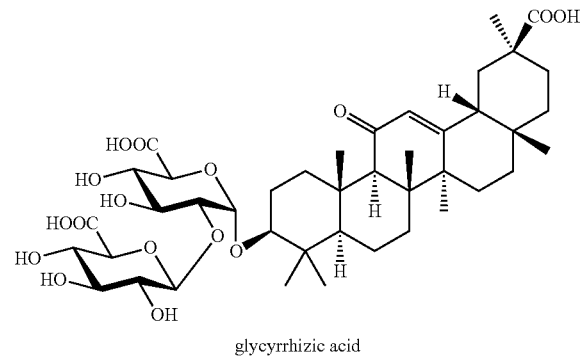

glycyrrhizic acid

Again, this finding per se could not have been predicted because glycyrrhizic acid and the glycyrrhinates have an intense liquorice flavor. It is possible for the purposes of the invention to employ the acid itself, its salts—for example sodium, potassium or ammonium salt—or the extracts of the plant *Glycyrrhiza glabra*. Especially preferred is monoammonium glycyrrhizate.

Extraction Method

If the above has referred to extracts, the latter may be prepared in a manner known per se, i.e. for example by means of an aqueous, alcoholic or aqueous-alcoholic extraction of the plants or plant parts or of the leaves or fruits. All traditional extraction methods, such as, for example, maceration, remaceration, digestion, agitation maceration, fluidized-bed extraction, ultrasound extraction, countercurrent extraction, percolation, repercolation, evacolation (extraction under reduced pressure), diacolation or solid-liquid extraction under continuous reflux are suitable. A method which is advantageous for use on an industrial scale is the percolation method. Fresh plants or plant parts may be employed as starting material; usually, however, the starting material will be dry plants and/or plant parts which may be comminuted mechanically before the extraction. Suitable for this purpose are all communication methods known to a person skilled in the art; an example which may be mentioned is freeze-grinding. Solvents which can be used for carrying out the extractions may be organic solvents, water (preferably hot water with a temperature of above 80° C. and in particular above 95° C.) or mixtures of organic solvents and water, in particular low-molecular-weight alcohols with higher or less high water contents. Particular preference is given to the extraction with methanol, ethanol, pentane, hexane, heptane, acetone, propylene glycols, polyethylene glycols and ethyl acetate and mixtures of these, and their aqueous mixtures. The extraction is usually carried out at 20 to 100° C., preferably at 30 to 90° C., in particular at 60 to 80° C. In a preferred embodiment, the extraction is carried out under an inert gas atmosphere so as to avoid oxidation of the active substances of the extract. This is important in particular in the case of extractions at temperatures of above 40° C. The extraction times are adjusted by the person skilled in the art as a function of the starting material for the extraction method, the extraction temperature, the ratio of solvent to raw material, inter alia. After the extraction, the resulting crude extracts may optionally be subjected to further customary steps such as, for example, purification, concentration and/or decoloration. If desired, the extracts thus prepared may be subjected, for example, to a selective removal of individual undesired ingredients. The extraction can be carried out to any desired degree of extraction, but is usually carried out exhaustively. Typical yields (=dry matter weight of the extract relative to weight of raw material employed) in the extraction of dried leaves are in the range of from 3 to 15, in particular 6 to 10% by weight. The present invention comprises the knowledge that the extraction conditions and the yields of the final extracts can be selected by one skilled in the art depending on the desired field of application. These extracts which, as a rule, have active substance contents (=solids contents) in the range of from 0.5 to 10% by weight can be employed as such; however, it is also possible to fully remove the solvent by drying, in particular by spray-drying or freeze-drying, where a deep red solid remains. The extracts may also be used as starting materials for obtaining the abovementioned pure active substances, unless the latter can be prepared more simply and with less financial outlay by the synthetic route. Accordingly, the active substance content of the extracts may amount to from 5 to 100, preferably from 50 to 95% by weight. The extracts themselves may be present as aqueous preparations and/or as preparations which are dissolved in organic solvents, and also as spray-dried or freeze-dried anhydrous solids. Organic solvents which are suitable in this context are, for example, the aliphatic alcohols having 1 to 6 carbon atoms (for example ethanol), ketones (for example acetone), halohydrocarbons (for example chloroform or methylene chloride), lower esters or polyols (for example glycerol or glycols).

Substance Mixtures

In a further preferred embodiment, the substance mixtures may have the following compositions, viz.
(a) approximately 20 to approximately 80, preferably approximately 40 to approximately 60% by weight of monocyclic terpenes, specifically D-limonene, and
(b) approximately 80 to approximately 20, preferably approximately 40 to approximately 60% by weight of rebaudiosides or plant extracts comprising them, in particular rebaudioside A,
(c) 0 to approximately 10, preferably approximately 0.5 to approximately 8 and in particular approximately 1 to approximately 5% by weight of active substances selected from the group consisting of naringin, dihydrochalcones, mogrosides, rubosides and extracts of plants of the genus *Rubus*, and
(d) 0 to approximately 10, preferably approximately 0.5 to approximately 8 and in particular approximately 1 to approximately 5% by weight of glycyrrhizic acid, its salts or plant extracts containing them, with the proviso that the amounts stated are optionally complemented by water to make up 100% by weight.

Furthermore, the substance mixtures can be distinguished by the fact that they have a water content of less than approximately 2 and in particular of less than approximately 1% by weight. By preference, the mixtures are entirely anhydrous. To this end, aqueous and/or alcoholic solutions or dispersions of the substance mixtures may be dried, for example by spray-drying, fluidized-bed drying or lyophilization (freeze-drying). The dry preparations may subsequently be either ground or granulated.

Capsules

In a further development of the invention, the substance mixtures may be present as capsules. Also suitable besides customary gelatin-based microcapsules are, in particular, so-called microcapsules or nanocapsules. These are taken by the skilled worker to mean spherical aggregates with a diameter in the range of from approximately 0.0001 to approximately 5 and preferably 0.005 to 0.5 mm and which comprise at least one solid or liquid core which is enclosed by at least one continuous envelope. More precisely, they are finely-dispersed liquid or solid phases which are enveloped by film-forming polymers and during whose preparation the polymers, after emulsification and coacervation or interface polymerization, precipitate on the material to be enveloped. In a different method, molten waxes are taken up in a matrix ("microsponge") which, as microparticles, may additionally be enveloped by film-forming polymers. In a third method, particles are coated in turn with differently charged polyelectrolytes ("layer-by-layer" method). The microscopic capsules may be dried like powders. Besides single-core microcapsules, multi-core aggregates, which comprise two or more cores distributed within continuous enveloping material, also referred to as microspheres, are also known. Single- or multi-core microcapsules may additionally be enclosed by another second, third etc. envelope. The envelope may be composed of natural, semisynthetic or synthetic materials. Examples of natural enveloping materials are gum Arabic, agar-agar, agarose, again maltodextrins, alginic acid or its salts, for example sodium alginate or calcium alginate, fats and fatty acids, cetyl alcohol, collagen, chitosan, lecithins, gelatin, albumin, shellac, polysaccharides such as starch or dextran, polypeptides, protein hydrolyzates, sucrose and waxes. Semisynthetic enveloping materials are, inter alia, chemically modified celluloses, in particular cellulose esters and cellulose ethers, for example cellulose acetate, ethylcellulose, hydroxypropylcellulose, hydroxypropylmethylcellulose and carboxymethylcellulose, and starch derivatives, in particular starch ethers and starch esters. Examples of synthetic enveloping materials are polymers such as polyacrylates, polyamides, polyvinyl alcohol or polyvinylpyrrolidone. Examples of prior-art microcapsules are the following commercial products (the enveloping material is in each case given in parentheses): Hallcrest Microcapsules (gelatin, gum Arabic), Coletica Thalaspheres (maritime collagen), Lipotec Millicapseln (alginic acid, agar-agar), Induchem Unispheres (lactose, microcrystalline cellulose, hydroxypropylmethylcellulose); Unicerin C30 (lactose, microcrystalline cellulose, hydroxypropylmethylcellulose), Kobo Glycospheres (modified starch, fatty acid esters, phospholipids), Softspheres (modified agar-agar) and Kuhs Probiol Nanospheres (phospholipids), and also Primaspheres and Primasponges (chitosan, alginates) and Primasys (phospholipids). Of particular interest for the encapsulation of preparations for cosmetic applications are coacervates of cationic polymers, in particular of chitosan, with anionic polymers, specifically with alginates. Suitable methods are described for example in the documents WO 2001 001926 A1, WO 2001 001927 A1, WO 2001 001928 A1 and WO 2001 001929 A1 (Cognis).

Gel Formers

Microcapsules frequently comprise the active substances dissolved or dispersed in a gel phase. Suitable gel formers are preferably those substances which have the property of forming gels in aqueous solution at temperatures of above 40° C. Typical examples therefor are heteropolysaccharides and proteins. Suitable thermo-gelling heteropolysaccharides are preferably agaroses, which, in the form of agar-agar, which is derived from red algen, may also be present together with up to 30% by weight of non-gelling agaropectins. The main constituent of the agaroses is linear polysaccharides of D-galactose and 3,6-anhydro-L-galactose, which are alternately β-1,3- and β-1,4-glycosidically linked. The heteropolysaccharides preferably have a molecular weight in the range of from 110 000 to 160 000 and are both colorless and flavorless. Suitable alternatives are pectins, xanthans (also xanthan gum) and their mixtures. Preference is furthermore given to those types which still form gels in 1% by weight strength aqueous solution, which do not melt below 80° C. and which resolidify above as little as 40° C. Examples which may be mentioned from the group of the thermo-gelling proteins are the various types of gelatin.

Cationic Polymers

Examples of suitable cationic polymers are cationic cellulose derivatives such as, for example, a quaternized hydroxyethylcellulose which is available from Amerchol under the name Polymer JR 400®, cationic starch, copolymers of diallylammonium salts and acrylamides, quaternized vinylpyrrolidone/vinylimidazole polymers such as, for example, Luviquat® (BASF), condensates of polyglycols and amines, quaternized collagen polypeptides such as, for example, lauryldimonium hydroxypropyl hydrolyzed collagen (Lamequat®L/Grunau), quaternized wheat polypeptides, polyethyleneimine, cationic silicone polymers such as, for example, amodimethicone, copolymers of adipic acid and dimethylaminohydroxypropyldiethylenetriamine (Cartaretine®/Sandoz), copolymers of acrylic acid with dimethyldiallylammonium chloride (Merquat® 550/Chemviron), polyaminopolyamides and their crosslinked water-soluble polymers, cationic chitin derivates such as, for example, quaternized chitosan, optionally in microcrystalline distribution, condensates of dihaloalkylene, such as, for example, dibromobutane, with bisdialkylamines, such as, for example, bisdimethylamino-1,3-propane, cationic guar gum such as, for example, Jaguar® CBS, Jaguar® C-17, Jaguar® C-16 from Celanese, quaternized ammonium salt polymers such as, for example, Mirapol® A-15, Mirapol® AD-1, Mirapol® AZ-1 from Miranol.

The preferred encapsulation material employed is chitosan. Chitosans are biopolymers and belong to the group of the hydrocolloids. Chemically, they are partially deacetylated chitins with different molecular weights which comprise the following—idealized—monomer unit:

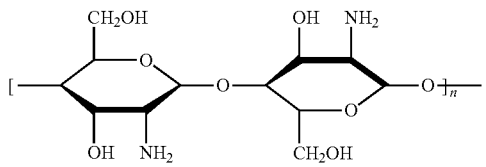

In contrast to most hydrocolloids, which carry a negative charge in the biological pH range, chitosans are cationic biopolymers under these conditions. The positively charged chitosans can interact with surfaces which carry the opposite charge and are therefore employed in cosmetic hair and body care products and in pharmaceutical preparations. To prepare the chitosans, one proceeds from chitin, preferably the residual shells of crustaceans, which, being inexpensive raw materials, are available in large quantities. The chitin here is usually first deproteinated by an addition of bases in a method which has first been described by Hackmann et al., dimineralized by adding mineral acids and finally deacetylated by adding strong bases, it being possible for the molecular weights to be distributed across a wide spectrum. It is preferred to employ those types which have an average molecular weight of from 10 000 to 500 000 or 800 000 to 1 200 000 Daltons and/or a Brookfield viscosity (1% by weight strength glycolic acid) of below 5000 mPas, a degree of deacetylation in the range of from 80 to 88% and an ash content of less than 0.3% by weight. For reasons of better solubility in water, the chitosans are usually employed in the form of their salts, preferably as the glycolates.

Anionic Polymers

The purpose of the anionic polymers is to form membranes with the cationic polymers.

Suitable for this purpose are preferably salts of alginic acid. Alginic acid is a mixture of carboxyl-group-comprising polysaccharides with the following idealized monomer unit:

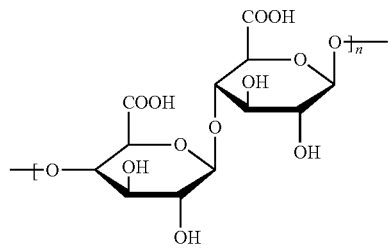

The average molecular weight of the alginic acids or the alginates is in the range of from 150 000 to 250 000. In this context, the salts of alginic acid are to be understood as meaning not only their full, but also their partial neutralization products, in particular the alkali metal salts, and among these preferably sodium alginate ("algin") and the ammonium and alkaline earth metal salts. Especially preferred are mixed alginates such as, for example, sodium/magnesium alginates or sodium/calcium alginates. In an alternative embodiment of the invention, however, anionic chitosan derivatives such as, for example, carboxylation products and above all succinylation products, are also suitable for this purpose. Alternative substances which are also suitable are poly(meth)acrylates with average molecular weights in the range of from 5000 to 50 000 Daltons and the various carboxymethylcelluloses. It is also possible to employ anionic surfactants or low-molecular-weight inorganic salts such as, for example, pyrophosphates, instead of the anionic polymers for forming the enveloping membrane.

Encapsulation

To prepare the microcapsules, the usual procedure is to prepare a 1 to 10, preferably 2 to 5% by weight strength aqueous solution of the gel former, preferably of the agar-agar, and to heat this solution under reflux. A second aqueous solution which comprises the cationic polymer, preferably chitosan, in amounts of from 0.1 to 2, preferably 0.25 to 0.5% by weight and the active substances in amounts of from 0.1 to 25 and in particular 0.25 to 10% by weight is added at the boil, preferably at 80 to 100° C.; this mixture is referred to as the matrix. The loading of the microcapsules with the active substances can therefore also amount to from 0.1 to 25% by weight, based on the capsule weight. If desired, it is also possible to add water-insoluble components, for example inorganic pigments, at this point in time so as to adjust the viscosity, and these water-insoluble components will, as a rule, be added in the form of aqueous or aqueous/alcoholic dispersions. To emulsify or disperse the active substances, it may furthermore be useful to add emulsifiers and/or solubilizers to the matrix. After the matrix has been prepared from gel former, cationic polymer and active substances, the matrix can optionally be dispersed very finely in an oil phase under high shear conditions so as to prepare the smallest possible particles during the subsequent encapsulation. In this context, it has proved to be especially advantageous to warm the matrix to temperatures in the range of from 40 to 60° C., while the oil phase is cooled to 10 to 20° C. The actual encapsulation, i.e. the formation of the enveloping membrane by bringing the cationic polymer in the matrix into contact with the anionic polymers, is then carried out in the last step, which is no longer optional, but mandatory. To this end, it is recommended to treat the matrix, which is optionally dispersed in the oil phase, with an aqueous, approximately 1 to 50 and preferably 10 to 15% by weight strength aqueous solution of the anionic polymer at a temperature in the range of from 40 to 100, preferably 50 to 60° C., and in this process—if required—simultaneously or subsequently to remove the oil phase. The aqueous preparations resulting from this process will, as a rule, have a microcapsule content in the range of from 1 to 10% by weight. In some cases, it may be advantageous for the solution of the polymers to comprise further constituents, for example emulsifiers or preservatives. Filtration gives microcapsules which have a mean diameter in the range of, preferably, from approximately 0.01 to 1 mm. It is recommended to sieve the capsules so as to ensure as uniform as possible a size distribution. The resulting microcapsules can have any shape in as far as this is a function of the preparation process, but they are preferably approximately spherical. As an alternative, it is also possible to employ the anionic polymers for preparing the matrix and to carry out the encapsulation with the cationic polymers, specifically with chitosans.

As an alternative, the encapsulation may also be carried out with the exclusive use of cationic polymers, exploiting their property of coagulating at pH values above the pKs value.

In a second alternative process for the preparation of the microcapsules according to the invention, an O/W emulsion, which comprises not only the liposome, water and the active substances, but also an effective amount of emulsifier, is first prepared. To prepare the matrix, this preparation is treated with a suitable amount of an aqueous anionic polymer solution, with vigorous stirring. The membrane is formed by addition of the chitosan solution. The entire procedure is preferably carried out in the weakly acidic range at pH=3 to 4. If required, the pH is adjusted by adding mineral acid. After the membrane has formed, the pH is raised to 5 to 6, for example by adding triethanolamine or another base. This results in an increase in viscosity, which can be aided further by addition of further thickeners such as, for example, polysaccharides, in particular xanthan gum, guar-guar, agar-agar, alginates and tyloses, carboxymethylcellulose and hydroxyethylcellulose, higher-molecular-weight polyethylene glycol monoesters and diesters of fatty acids, polyacrylates, polyacrylamides and the like. Finally, the microcapsules are separated from the aqueous phase, for example by decanting, filtration or centrifugation.

In a third alternative process, the microcapsules are formed around a core which is preferably solid, for example crystalline, by enveloping said core layer by layer with polyelectrolytes of opposite charges. In this context, reference shall be made to European Patent EP 1064088 B1 (Max-Planck Gesellschaft).

INDUSTRIAL APPLICABILITY

Another subject-matter of the present invention is directed to foodstuffs which comprise the substance mixtures according to the invention. In this context, the term foodstuff is to be understood in the broad sense and comprises, in accordance with the invention, not only foods such as, for example, beverages (for example ice teas, lemonades and the like), baked goods, dairy produce and the like, but also luxury items such as, for example, chewing gums, or products which, while not intended to be consumed, are brought into contact for example with the oral cavity, such as, for example, toothpastes, mouthwashes and the like. The substance mixtures according to the invention can be present in said compositions in an effective amount such as, for example, approximately 0.1 to approximately 2, preferably approximately 0.5 to approximately 1% by weight, based on the ready-to-eat product.

A further aspect of the invention relates to a method for improving the taste properties of monocyclic terpenes, which is characterized in that an effective amount of rebaudiosides or plant extracts comprising them are added to them. Finally, the invention also further relates to the use of rebaudiosides or plant extracts comprising them for improving the taste properties of monocyclic terpenes, specifically of d-limonene.

EXAMPLES

Examples 1 to 5

Comparative Example C1

Various substance mixtures based on D-limonene were used for preparing soft drinks, and the products were stored for 48 h at 20° C. Thereafter, the taste properties were assessed by a panel consisting of 5 trained testers, using a scale from 1 (absent) to 10 (highly pronounced). The compositions and results are compiled in table 1 hereinbelow. The data are means of 5 serial measurements. Examples 1 to 5 are in accordance with the invention, example C1 is given for comparison reasons. Example S corresponds to the standard, i.e. the assessment of the taste of the starting product immediately after its preparation.

TABLE 1

| | Taste properties of soft drink formulations | | | | | | |
|---|---|---|---|---|---|---|---|
| Composition | S | C1 | 1 | 2 | 3 | 4 | 5 |
| Sucrose | 10 | 10 | 10 | 10 | 10 | 10 | 10 |
| Citric acid | 0.2 | 0.2 | 0.2 | 0.2 | 0.2 | 0.2 | 0.2 |
| D-Limonene | 0.01 | 0.01 | 0.01 | 0.01 | 0.01 | 0.01 | 0.01 |

TABLE 1-continued

Taste properties of soft drink formulations

| Composition | S | C1 | 1 | 2 | 3 | 4 | 5 |
|---|---|---|---|---|---|---|---|
| Rebaudioside | — | — | 0.002 | — | 0.002 | 0.002 | 0.002 |
| Stevia extract | — | — | — | 0.002 | — | — | — |
| Glycyrrhizic acid-ammonium salt | — | — | — | — | 0.001 | — | — |
| Neohesperidin dihydrochalcone | — | — | — | — | — | 0.001 | — |
| Mogroside V | — | — | — | — | — | — | 0.001 |
| Water | | | | to 100 | | | |
| Assessment of the taste | | | | | | | |
| Citrus note | 7 | 5 | 8 | 8 | 9 | 9 | 9 |
| Herbaceous note | 0 | 5 | 2 | 3 | 2 | 2 | 2 |
| Caraway note | 0 | 5 | 2 | 3 | 2 | 2 | 2 |
| Bitterness | 3 | 4 | 2 | 2 | 2 | 1 | 1 |

The examples and comparative examples demonstrate that the problem of the invention is being solved in its entirety: while the starting formulation loses much of its fruity note on storage while developing a herbaceous taste with a pronounced caraway note, this is not only prevented by the addition of small amounts of steviosides, but the citrus note is even enhanced. This effect can be improved further by the further addition of glycyrrhizic acid and/or other active substances.

Formulation Examples

TABLE 2a

Chewing-gum compositions

| Composition | A | B | C | D | E | F | G | H |
|---|---|---|---|---|---|---|---|---|
| Polyisobutylene (MW 20 000) | 30.0 | 30.0 | 30.0 | 40.0 | 20.0 | 20.0 | 25.0 | 30.0 |
| Glucose | 51.0 | 51.0 | 51.0 | 42.5 | | | | |
| Corn syrup | 10.0 | 10.0 | 10.0 | 8.0 | | | | |
| Sorbitol | | | | | 51.0 | 51.0 | 47.5 | 44.5 |
| Mannitol | | | | | 5.0 | 5.0 | 4.3 | 3.6 |
| Glycerol | 1.8 | 1.8 | 1.8 | 1.8 | 8.0 | 8.0 | 8.0 | 7.0 |
| Lycasin:glycerol (1:1) | | | | | 8.2 | 8.2 | 8.0 | 7.0 |
| Lecithin | | | | | 0.2 | 0.2 | 0.2 | 0.2 |
| D-Limonene/rebaudioside A (1:1) | 1.0 | 1.0 | 1.0 | 1.0 | 1.0 | 1.0 | 1.0 | 1.0 |
| Water | | | | to 100 | | | | |

TABLE 2b

Toothpaste composition

| Component | Commercial product | Amount [% by weight] |
|---|---|---|
| Precipitated silica | Sident ® 12 DS | 18.0 |
| Silica thickener | Aerosil ® 200 | 0.8 |
| Sorbitol | | 17.5 |
| Glycerol | | 17.5 |
| Carboxymethylcellulose | Relatin ® 100 SR | 0.9 |
| Sodium lauryl sulfate | Texapon ® K1296 | 2.0 |
| Sodium fluoride | | 0.22 |
| Saccharin-sodium | | 0.2 |
| D-Limonene/rebaudioside A (1:1) | | 1.0 |
| Water | | to 100 |

TABLE 2c

Mouthwash composition

| Component | Commercial product | Amount [% by weight] |
|---|---|---|
| Ethanol (96%) | | 10.0 |
| Sorbitan monolaurate + 20 EO | Tween ® 20 | 0.4 |
| D-Limonene/rebaudioside A (1:1) | | 0.3 |
| Sorbitol (70% strength aqueous solution) | | 8.0 |
| Methyl p-hydroxybenzoate | | 0.2 |
| Water | | to 100 |

We claim:

1. A substance mixture comprising:
   (a) 20 to 80% by weight of D-limonene; and
   (b) 15 to 80% by weight of rebaudiosides or plant extracts comprising them; and further comprising:
   (c) 0.5 to 8% by weight of dihydrochalcones, mogrosides, and/or rubusosides; and/or
   (d) 0.5 to 8% by weight of glycyrrhizic acid and/or salts thereof;
     provided that (b), (c), if present, and (d), if present, are in amounts sufficient to enhance a citrus note and reduce an herbaceous note, an undesirable caraway note, and bitterness of the D-limonene and oxidative degradation products thereof.

2. The substance mixture of claim 1, wherein the rebaudiosides of (b) include rebaudio side A.

3. The substance mixture of claim 1 comprising:
   (c) 0.5 to 8% by weight of rubusosides.

4. The substance mixture of claim 1 comprising:
   (d) 0.5 to 8% by weight of glycyrrhizic acid and/or salts thereof.

5. The substance mixture of claim 4, wherein the salts of glycyrrhizic acid are selected from the group consisting of sodium, potassium, and ammonium salts of glycyrrhizic acid.

6. The substance mixture of claim 1, wherein the ratio of (a) to (b) is 25:75 to 75:25.

7. The substance mixture of claim 1, wherein the ratio of (a) to (b) is 40:60 to 60:40.

8. The substance mixture of claim 1, present in the form of capsules.

9. The substance mixture of claim 1 consisting of:
   (a) 20 to 80% by weight of D-limonene;
   (b) 15 to 80% by weight of rebaudiosides;

(c) 0.5 to 8% by weight of dihydrochalcones, mogrosides, and/or rubusosides;
(d) optionally, 0.5 to 8% by weight of glycyrrhizic acid and/or salts thereof; and
(e) optionally, water.

10. The substance mixture of claim 1 consisting of:
(a) 20 to 80% by weight of D-limonene;
(b) 15 to 80% by weight of rebaudiosides;
(c) 0.5 to 8% by weight of dihydrochalcones;
(d) optionally, 0.5 to 8% by weight of glycyrrhizic acid and/or salts thereof; and
(e) optionally, water.

11. The substance mixture of claim 1 consisting of:
(a) 20 to 80% by weight of D-limonene;
(b) 15 to 80% by weight of rebaudiosides;
(c) 0.5 to 8% by weight of mogrosides;
(d) optionally, 0.5 to 8% by weight of glycyrrhizic acid and/or salts thereof; and
(e) optionally, water.

12. The substance mixture of claim 1 consisting of:
(a) 20 to 80% by weight of D-limonene;
(b) 15 to 80% by weight of rebaudiosides;
(c) 0.5 to 8% by weight of rubusosides;
(d) optionally, 0.5 to 8% by weight of glycyrrhizic acid and/or salts thereof; and
(e) optionally, water.

13. A method for improving a citrus note while simultaneously reducing an undesirable herbaceous note, an undesirable caraway note, and bitterness of D-limonene and oxidative degradation products thereof, the method comprising adding an effective amount of the substance mixture of claim 1 to a foodstuff.

14. A foodstuff comprising the substance mixture of claim 1.

15. A substance mixture comprising:
(a) D-limonene; and
(b) rebaudiosides or plant extracts comprising them; and further comprising:
(c) dihydrochalcones, mogrosides, and/or rubusosides; and/or
(d) glycyrrhizic acid and/or salts thereof;
provided that (b), (c), if present, and (d), if present, are in amounts sufficient to enhance a citrus note and reduce an herbaceous note, an undesirable caraway note, and bitterness of the D-limonene and oxidative degradation products thereof.

16. The substance mixture of claim 15 comprising dihydrochalcones.

17. The substance mixture of claim claim 15 comprising mogrosides.

18. The substance mixture of claim 15 comprising rubusosides.

19. The substance mixture of claim 15 comprising glycyrrhizic acid and/or salts thereof.

* * * * *